United States Patent [19]

Bhagat et al.

[11] Patent Number: 5,470,040
[45] Date of Patent: Nov. 28, 1995

[54] APPARATUS FOR A COMPUTER POINTING DEVICE

[75] Inventors: Gopal C. Bhagat; James M. Webster, both of Houston, Tex.

[73] Assignee: Compaq Computer Corporation, Houston, Tex.

[21] Appl. No.: 200,066

[22] Filed: Feb. 22, 1994

Related U.S. Application Data

[63] Continuation of Ser. No. 924,850, Aug. 4, 1992, abandoned.

[51] Int. Cl.$^6$ .................................................... F16M 13/00
[52] U.S. Cl. ................. 248/222.4; 248/918; 248/229.11
[58] Field of Search ...................... 24/3 F, 536; 248/918, 248/316.4, 316.2, 222.1, 221.4, 229, 225.31; 108/152; 250/221; 269/234, 229

[56] References Cited

U.S. PATENT DOCUMENTS

| | | | |
|---|---|---|---|
| 2,538,449 | 1/1951 | Freshwater | 248/115 |
| 3,640,497 | 2/1972 | Waki | 248/225 |
| 4,657,216 | 4/1987 | Southgate | 248/187 |
| 4,866,602 | 9/1989 | Hall | 364/200 |
| 4,913,387 | 4/1990 | Tice | 248/918 |
| 4,917,516 | 4/1990 | Retter | 400/489 |
| 5,008,528 | 4/1991 | Duchon | 250/221 |
| 5,119,742 | 6/1992 | Simmie | 108/152 |
| 5,121,863 | 6/1992 | Kotitalo et al. | 224/42.45 R |
| 5,208,736 | 5/1993 | Crooks et al. | 361/393 |

OTHER PUBLICATIONS

Complete Logitech Trackman® Portable product with packaging and documents.
"Logitech Getting Started for Trackman® Portable", ©1991 by Logitech, Inc., Fremont, Calif. 94555 (30 pages total, including cover pages).
Complete Appoint Thumbelina P. C. product with packaging and documents.
"Logitech Trackman® Portable" packaging, ©1991 Logitech, Inc., Fremont, Calif (2 pages total—front and back of box).
Thumbelina "Keyboard Mounting Kit" instructions (1 sheet).
Thumbelina "Laptop Mounting Kit" instructions (1 sheet).
Thumbelina Guide to Operations, PC and Portable Versions, Version 3.0, ©APPOINT 1989, 1990, 1991, 1992 (21 pages total including cover pages).
Thumbelina PC, The World's Most Versatile Mouse, APPOINT packaging (2 pages total—front and back of box) *** Note: "Patents Pending" on p. 2.
Complete Microsoft® BallPoint Mouse product with packaging and documents.
Microsoft® BallPoint Mouse brochure entitled "Three steps and you're ready to roll", ©1991 Microsoft Corporation (Note "U.S. Pat. No. 4,666,602 and patent pending" on brochure) (1 page total).
Microsoft® BallPoint Mouse User's Guide, Version 8.20, ©Copyright Microsoft Corporation, 1984–1992 (64 pages total including cover pages).
Microsoft® BallPoint mouse packaging, ©1992 Microsoft Corporation (2 pages total—front and back of box).
PC Week, Jun. 22, 1992, vol. 9, No. 25, pp. 126–127 (2 pages total).
PC Magazine, Jun. 16, 1992, vol. 11, No. 11, Front cover page, pp. 10, 365–368 (6 pages total).

(List continued on next page.)

*Primary Examiner*—Rinaldi I. Rada
*Attorney, Agent, or Firm*—Pravel, Hewitt, Kimball & Krieger

[57] ABSTRACT

An apparatus for positioning a pointing device relative to a computer is either free-standing relative to the computer or releasably attached to the computer by a clamp. Buttons for moving the clamp jaw of the clamp from a home position to an extended position for attaching the attachment housing to the computer itself are ergonomically positioned. A hinge and clutch spring are disposed between the apparatus and the pointing device for unlimited pivotable positioning of the pointing device within a 90° range for selected user positioning.

15 Claims, 3 Drawing Sheets

OTHER PUBLICATIONS

PC Week, Feb. 24, 1992, vol. 9, No. 8; Front cover page, pp. 88–89 (foldouts) (5 pages total).

PC Week, Apr. 20, 1992, vol. 9, No. 16; Front cover page, pp. 74–75 (foldouts) (6 pages total).

"Traveling Companions", *PC World,* vol. 10, No. 2, Feb. 1992, pp. 182–189 (San Francisco, Calif.) (11 pages total).

Texas Instrument Advertisement, *PC Magazine,* vol. 11, No. 7, Apr. 14, 1992, p. 157 (New York, N.Y.) (3 pages total).

"Microsoft Ballpoint Mouse User's Guide", Microsoft Corporation, 1984–1991, pp. 7–14 (USA) (13 pages total).

Photographs A–F, Logitech, Inc., bracket attachments for Trackman© Portable Mouse.

APPARATUS FOR A COMPUTER POINTING DEVICE

This is a continuation of application Ser. No. 07/924,850 filed Aug. 4, 1992 now abandoned.

BACKGROUND OF THE INVENTION

This invention relates to an apparatus for positioning a pointing device, such as a mouse or trackball, relative to a computer.

Considerable advances have been made in recent years in the design of portable computers. Laptop computers, or "notebooks," may weigh as little as six pounds, thereby making them very transportable.

Like the larger desktop computers, many laptop computers contain built-in ports which allow for the electrical connection of the pointing device to the computer. For a laptop computer, however, it is desirable to have a pointing device which may be clamped to the laptop, particularly when traveling, for example, on an airplane where work space area is limited. Presently, there are laptop computers on the market which provide a mouse or trackball attachment. MicroSpeed, Inc. of Freemont, Calif., and Suncom Technologies of Niles, Ill., for example, manufacture dual lock devices for attaching their particular trackball pointing devices to the laptop keyboard, as disclosed on page 187 of "Traveling Companions," PC World, Vol. 10, No. 2, 2/92, pp. 182–189. Similarly, Appoint of Pleasanton, Calif., and Microsoft Corp. of Redmond, Wash., manufacture bracket attachments for affixing their respective laptop pointing devices, such as the "Thumbelina" (Appoint) and the "Ball-Point" Mouse (Microsoft), to a keyboard.

In Microsoft's bracket attachment, the clamping mechanism operates by individually screwing a pair of clamp arms, each having a pair of thumb screws integral with the clamp arms, as opposed to actuating one or more spring-biased buttons. The clamp arms are individually moved between the home position and the extended position by turning their respective thumb screws. Once the bracket is attached to the computer, the pointing device is slid into the bracket. The bracket also has a hinge mechanism for pivotally moving the pointing device into a selected user position which operates by simultaneously depressing a pair of buttons. However, Microsoft's hinge assembly allows for only four positioning angles within a 0°–90° range of movement.

Logitech, Inc. of Freemont, Calif. also manufactures a bracket attachment for clamping its pointing device to the edge of a laptop keyboard. The bracket attachment comprises a housing having a clamping side and a clamp jaw, which moves relative to the housing. However, unlike the present invention, the Logitech attachment operates by depressing a single button located at the rear of the attachment housing. Also unlike the present invention, the Logitech button is actuated perpendicular to the clamping side of the housing. When depressed, the button pushes against a leaf spring contained within the housing to move the clamp Jaw from the home position to the extended position. The Logitech bracket attachment does not contain a hinge mechanism for adjusting the pointing device into different angle positions. Once the bracket attachment is mounted onto the computer, the pointing device is then attached to the bracket attachment.

Logitech manufactures two different models of its bracket, with the only difference between the two attachments being the location of the clamp Jaw in the home position, when the bracket attachment is not mounted on the computer keyboard. In one model, which is designed for keyboards having relatively thick edges, the clamp Jaw does not come into contact with the clamping side of the housing when the clamp Jaw in the home position. In the second model, the clamp jaw does contact the clamping side of the housing when the clamp Jaw is in the home position.

BRIEF SUMMARY OF THE INVENTION

An apparatus for positioning a pointing device, such as mouse or trackball, relative to a computer is provided. The apparatus may be free-standing relative to the computer or it may be secured to the computer itself by a clamp. The apparatus comprises a clamp which is movably mounted within the attachment housing, and an actuator or buttons ergonomically positioned for moving the clamp from a home position to an extended position to secure the clamping apparatus to the computer itself. A hinge and clutch spring are disposed between the attachment housing and the pointing device for unlimited pivotable positioning of the pointing device within a 90° range while maintaining the pointing device in any selected user position within 0°–90°. The attachment housing may also be provided with friction pads to prevent or reduce movement of the attachment housing when the attachment housing is in a free-standing position as opposed to being mounted onto the computer itself.

BRIEF DESCRIPTION OF THE FIGURES

The objects, advantages, and features of the invention will become more apparent by reference to the drawings which are appended hereto and wherein like numerals indicate like parts and wherein an illustrated embodiment of the invention is shown, of which.

DETAILED DESCRIPTION OF THE PREFERRED EMBODIMENT

The present invention is directed to a unique pointing device apparatus, generally indicated at 10, that is compact, ergonomically compatible, and mechanically functional for use with a computer C. The preferred embodiment comprises an attachment housing 12 having an elongated clamping side 14, a clamp means 16 having a clamp jaw 16A which is movably mounted within the attachment housing 12, an actuation means 18A, 18B for moving the clamp means from a home position (FIG. 5) to an extended position (FIGS. 6 and 7), and an urging means or springs 20A, 20B for urging the clamp means from the extended position to the home position.

The preferred embodiment of the present invention is designed to attach a pointing device P to the edge of a computer keyboard K wherein the attachment is achieved by actuating two buttons 18A, 18B, (the actuation means) located on each side of the attachment housing 12. The attachment housing 12, which may already have secured to it the pointing device P, can be easily grasped in one hand, and the two buttons 18A, 18B can be simultaneously "squeezed" substantially parallel to the longitudinal axis A of the clamping side 14 to cause the clamp jaw 16A to extend outward from a home position so that the edge of the keyboard K may be placed in between the movable clamp jaw 16A and the clamping side 14 of the housing 12. When the buttons 18A, 18B are released, the springs 20A, 20B cause the clamp jaw 16A to return to the home position to thereby secure the edge of the keyboard K between the clamp jaw 16A and elongated clamping side 14.

Figure 5:
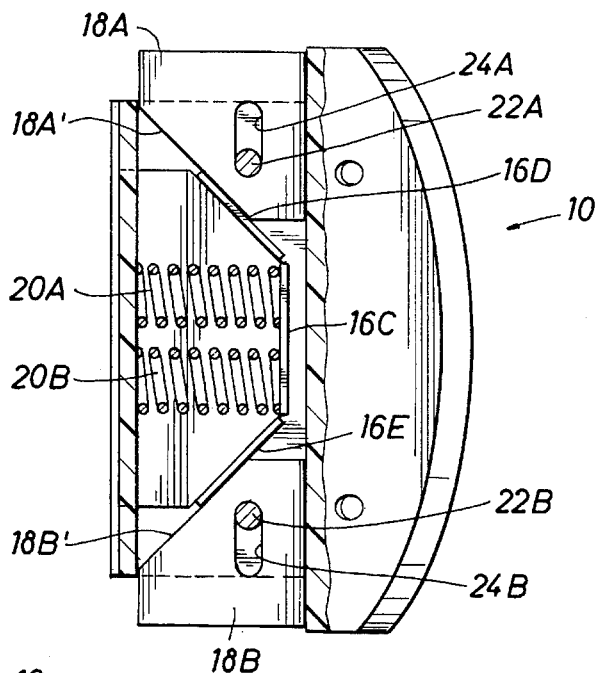
FIG. 5 is a section view of the present invention with the clamp in the home position.
Figure 6:
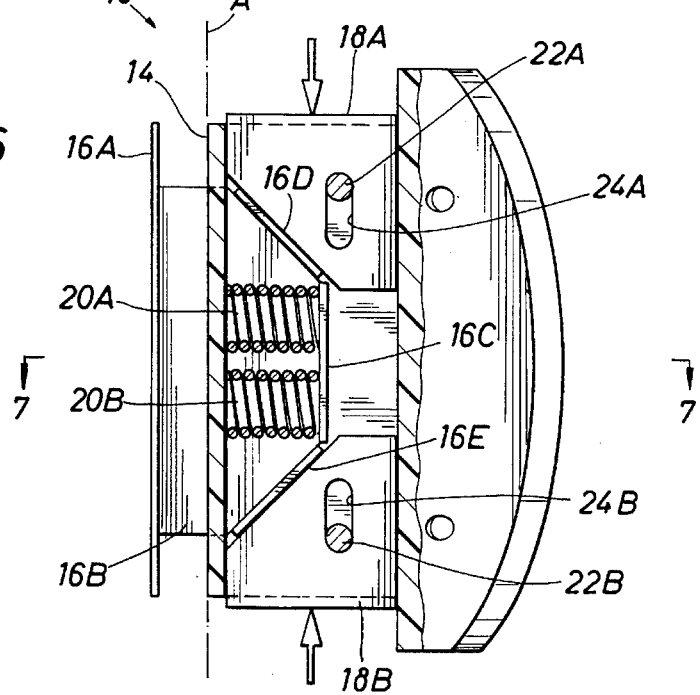
FIG. 6 is a section view taken along lines 6—6 of FIG. 7, similar to FIG. 5, but with the clamp in the extended position.
Figure 7:
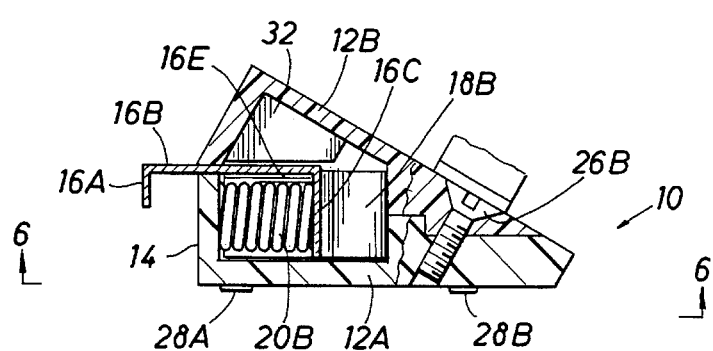
FIG. 7 is a section view of the present invention taken along lines 7—7 of FIG. 6.

Referring now to FIGS. 5–7, the clamp means 16 comprises a clamp jaw 16A which extends 90° from clamping plate 16B so that it is parallel to the clamping side 14 of the attachment housing 12; a holding means 16C for holding one end of the springs 20A, 20B and which extends 90° from clamping plate 16B so that the holding means is parallel to the clamp jaw 16A; a pair of ramp means 16D and 16E which are slidably engaged with buttons 18A, 18B, respectively; a clamping plate 16B disposed between but integral with, the clamp jaw 16A, ramp means 16D, 16E, and holding means 16C. The clamp means 16 may be formed of any conventional material such as metal or plastic, but preferably a metal alloy such as steel.

In the preferred embodiment the urging means is a pair of compression springs 20A, 20B positioned parallel to one another and disposed between the holding means 16C and the clamping side 14 of the housing 12. Alternatively, the urging means 20 may comprise a single compression spring element or similar resilient member such as a leaf spring or coil spring that would urge the clamp jaw 16A to its home position, though at a force so that actuation is facilitated. The springs could be formed of a suitable material, such as a metal or metal alloy, for example, which allow the springs 20 to return to their original position after being compressed by the clamp means 16 upon actuation of the buttons 18, as discussed in more detail below.

As shown in FIGS. 5 and 6, the apparatus is actuated by depressing or "squeezing" two pentahedral shaped buttons 18A, 18B located on each side of the attachment housing 12, each button having a ramped side 18A', 18B' respectively, contained within the housing 12 to slidably contact the outer surface of each ramp means 16D, 16E, respectively. When "squeezed" or depressed in the direction of the arrows, as shown in FIG. 6, (i.e. parallel to the longitudinal axis A of the clamping side 14), the ramped sides 18A', 18B' of the buttons slide against the ramp means 16D, 16E, respectively, to compress the springs 20A, 20B and subsequently move the clamp means 16 outwardly into an extended position, as shown in FIGS. 6 and 7. The edge of the computer keyboard K can then be placed between the extended clamp jaw 16A and the clamping side 14 of the housing 12. The buttons 18 are then released to allow the springs 20 to urge the clamping means 16 back to the home position to engage or "clamp" the apparatus to the keyboard K edge.

To limit the movement of the buttons 18A, 18B the apparatus comprises a blocking means 22A, 22B, 24A, 24B.

In the preferred embodiment, the blocking means is pins 22A, 22B which at one end are integrally attached to the base portion 12A of the housing 12 and at the other end are slidably disposed within slots 24A, 24B, respectively contained within each button 18A, 18B. As shown in FIG. 5, when the clamp means 16 is in the home position, the pins 22A, 22B contact the inner ends of the slots 24A, 24B, respectively. The buttons 18A, 18B are further guided within the attachment housing 12 by the elongated clamping side 14, of the base portion 12A, and the top portion 12B.

As shown in FIGS. 6 and 7, the base portion 12A and top portion 12B are affixed to each other towards the rear end of the attachment housing 12 by a pair of screws. Though two screws are used only a typical screw 26B is shown in FIG. 7. However, other means of attachment, such as bolts or adhesives, for example, are contemplated in the present invention. As shown in FIG. 7, the base portion 12A of the housing 12 and the clamping side 14 are all preferably one piece to form a substantially L-shaped component. The elongated clamping side 14 is stationary relative to the sliding clamp means 16 and, in conjunction with the clamp jaw 16A, serves to maintain the attachment housing 12 to the edge of the computer keyboard K.

Figure 1:
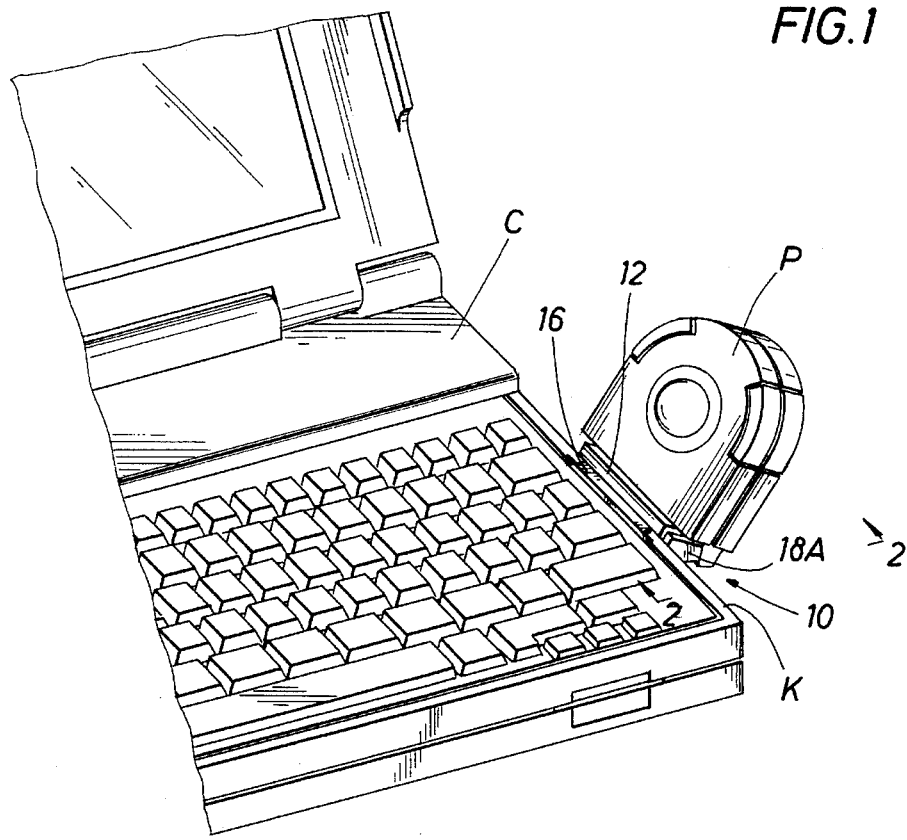
FIG. 1 is a perspective view of the present invention shown mounted onto the edge of a laptop computer keyboard.
Figure 2:
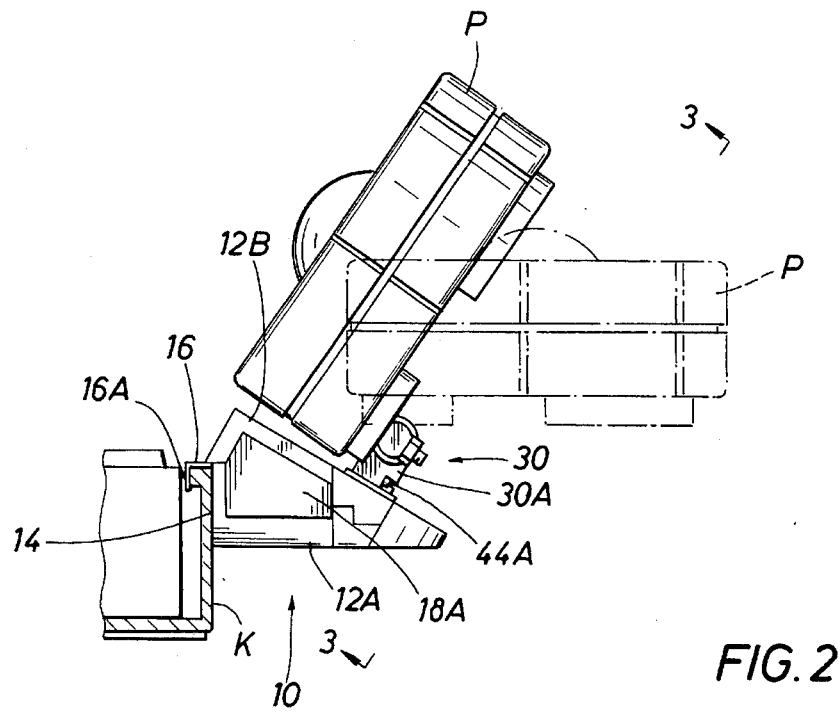
FIG. 2 is an enlarged section view of the present invention shown in solid lines taken along lines 2—2 of FIG. 1 and the present invention shown in phantom lines in the horizontal position.
Figure 3:
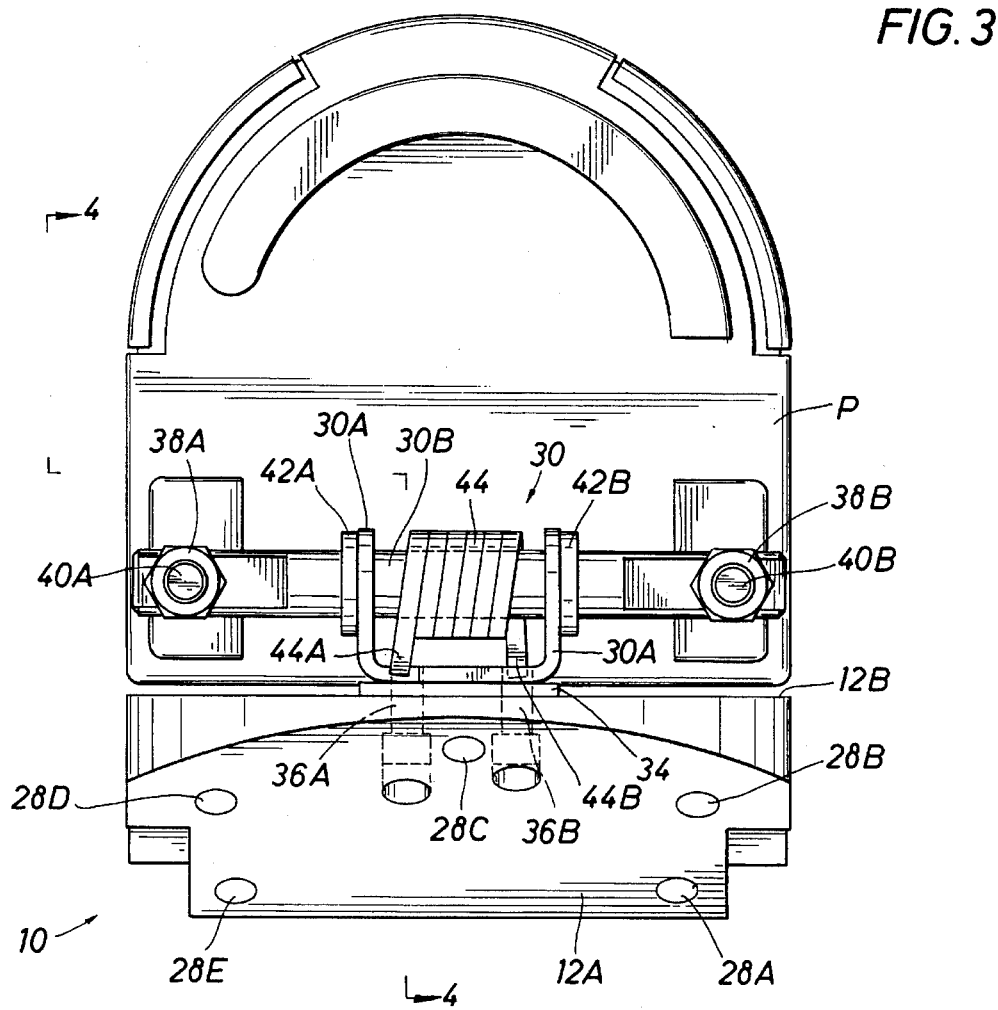
FIG. 3 is an enlarged section view of the present invention taken along lines 3—3 of FIG. 2.

The base portion 12A of the housing also has an outer surface perpendicular to the elongated clamping side 14. As best shown in FIGS. 3 and 7, the outer surface of the base portion 12A preferably has five (5) "friction pads" 28A–E made of rubber or an equivalent material to limit the movement of the apparatus when the apparatus is in a free-standing position, as opposed to being attached to the computer. In the preferred embodiment the apparatus may be used in the free-standing position when the pointing device P is in its maximum upright position, as shown by the solid lines in FIG. 2, or when the pointing device P is positioned 90° relative to the upright position. In this latter position, the upper end of the pointing device P contacts the surface and the friction pads 28A, 28B, 28C, 28D and 28E minimize the movement of the apparatus. The attachment housing may, however, be formed of a heavier or more dense material so that the pointing device P may be positioned at any angle within a 90° range without tipping over.

The one-piece top portion of the housing 12B is also substantially L-shaped, with a front wall extending downward at an angle above the clamping plate 16B. As best shown in FIGS. 2 and 7, the top portion 12B is aligned at an angle relative to the base portion 12A to form an attachment housing 12 having a pentahedral shape. In this preferred embodiment, the pointing device P is already in a comfortable user position when the pointing device P is in its maximum upright position, as shown by the solid lines in FIG. 2. The apparatus is provided with a hinge means, generally indicated at 30, to allow for unlimited positioning of the pointing device P within a 90° range. The preferred alignment of the attachment housing 12, as shown in FIGS. 2 and 7, allows for a greater number of comfortable user positions within a 90° range as compared to an embodiment where the top housing portion 12B is substantially parallel to the base housing portion 12A. FIG. 2 shows the pointing device P in a substantially horizontal position (phantom lines); however, the pointing device P may be further positioned a maximum of 90° from its full upright position (solid lines) which may also be a desired user position.

Referring to FIG. 7, the upper surface of the clamping plate 16B is constrained within the attachment housing by a ramp-like projection 32 which is affixed to the inner surface of the top housing portion 12B and conforms to the right-angle shape of the top housing portion 12B. The clamp means 16 is further constrained within the housing 12 by the inner surface of the base housing portion 12A, which prevent the holding means 16C from moving downward, and the clamping side 14.

Figure 4:
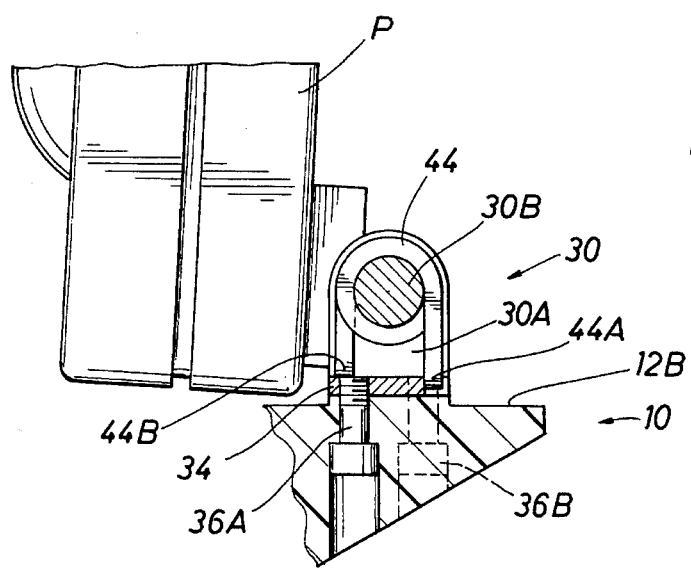
FIG. 4 is a section view of the present invention taken along lines 4—4 of FIG. 3.

As best shown in FIGS. 2–4, the apparatus of the present Invention may also include a hinge means 30 and a clutch means 44 which enables unlimited pivotable positioning of the pointing device P to the housing 12 within a 90° range while maintaining the pointing device P in a selected user position relative to the housing 12. The pointing device P may be positioned relative to the attachment housing 12 from a maximum upright position (FIG. 2 solid lines) to a position 90° clockwise to FIG. 2 (not shown), or any position in between (e.g. FIG. 2 phantom lines). Alternatives to the clutch means, such as a ratchet mechanism, spring loaded ball, or starwheel, for example, can only provide a limited number of angle positions such as found in Microsoft's hinge assembly.

The hinge means 30 comprises a bracket 30A which is mounted on a raised platform 34, integrally and centrally located on the top portion 12B of the housing 12. The bracket 30 is preferably mounted by two screws 36A, 36B which extend downward through both the top portion 12B and base portion 12A of the housing 12. The bracket 30A includes sufficiently large apertures through which a rod 30B may be received. The rod 30B is fixedly secured at each of its ends to the pointing device P by some attachment means, such as nuts 38A, 38B and screws 40A, 40B; however, other means of attachment such as adhesives or belts, for example, may be employed.

As best shown in FIG. 3, contacting each outer side of the bracket 30A and disposed about the rod 30B are washers 42A, 42B. Disposed between the bracket 30A is the clutch means 44 which is a helical member concentrically disposed about the rod 30B. As best shown in FIG. 4, a cross-sectional side view taken along lines 4–4 of FIG. 3, each end 44A, 44B of the clutch means 44 is secured within a slotted portion of the base of the bracket 30A. The clutch means 44 has a sufficient torque to limit the movement of the pointing device P during normal operation of the pointing device P while at the same time allows easy rotation of the rod 30B within the bracket 30A and provides a breakaway mechanism in the event the user accidentally applies excessive force on the pointing device P. In the preferred embodiment, the clutch means 44 has a torque rating of between 24 to 64 ounce inches. Preferably the torque is approximately 32 ounce inches, to provide innumerable indexing positions for ergonometric ease and hand comfort for individual users of the pointing device.

The components of the apparatus, such as, for example, the top 12B and base portions 12A of the attachment housing 12, the buttons 18, the raised platform 34, and the ramp-like projection 32 may be formed of any conventional material; however, a lightweight material, such as a plastic is preferred to minimize undue stress on the keyboard K edge and to reduce the overall weight of the laptop computer C. The hinge means 30, clutch means 44, clamp means 16, and the pair of springs 20A, 20B disposed within the clamp means 16, are preferably formed of a metal or metal alloy, such as steel, for example.

In the figures, the illustrated pointing device P is a ballpoint unit manufactured by Microsoft Corporation of Redmond, Wash. It is understood that the use of that particular unit is exemplary and other particular pointing devices can be utilized with appropriate changes in the hinge means 30.

The foregoing disclosure and description of the invention are illustrative and explanatory thereof, and various changes in the size, shape, and materials, as well as in the details of the illustrated construction may be made without departing from the spirit of the invention.

What is claimed is:

1. Apparatus for releasably attaching a pointing device to a computer, said apparatus comprising
   an attachment housing having an elongated clamping side, said clamping side having a longitudinal axis,
   a passage having an axis and extending through said housing, said passage axis being substantially parallel to said clamping side longitudinal axis,
   a clamp mounted with said housing, said clamp movable relative to said housing clamping side between a home position and an extended position for clamping said housing to the computer, and
   a pair of buttons positioned in said passage and engaging said clamp means, said buttons movable in said passage for moving said clamp means from said home position to said extended position.

2. Apparatus of claim 1 further comprising a slot and pin interengaged between each of said buttons and said housing to limit movement of said buttons.

3. Apparatus of claim 1 further comprising at least one spring having a first end and a second end perpendicular to said clamping side longitudinal axis for urging said clamp from said extended position to said home position.

4. Apparatus for releasably attaching a pointing device to a computer, said apparatus comprising
   an attachment housing having an elongated clamping side, said clamping side having a longitudinal axis,
   a clamp mounted with said housing, said clamp movable relative to said housing clamping side between a home position and an extended position for clamping said housing to the computer,
   actuation means engaged with said clamp and movable towards each other substantially parallel to said clamping side longitudinal axis for moving said clamp from said home position to said extended position, and
   a slot and pin interengaged between said actuation means and said housing to limit movement of said actuation means.

5. Apparatus for releasably attaching a pointing device to a computer, said apparatus comprising
   an attachment housing having an elongated clamping side, said clamping side having a longitudinal axis,
   a passage having an axis and extending through said housing, said passage axis being substantially parallel to said clamping side longitudinal axis,
   a clamp mounted with said housing, said clamp movable relative to said housing clamping side between a home position and an extended position for clamping said housing to the computer, said clamp comprises
   a clamp jaw,
   a holding means,
   a ramp, and
   a plate to interconnect said clamp jaw, said ramp, and said holding means, and
   a pair of buttons engaging said ramp, said buttons movable in said passage towards each other for moving said clamp jaw from said home position to said extended position.

6. Apparatus of claim 5 further comprising a spring being disposed between said holding means and said clamping side of said attachment housing.

7. Apparatus for positioning a pointing device relative to a computer, said apparatus comprising an attachment housing having a clamping side, a bracket and a rod disposed between said housing and the pointing device; and a helical member having a first and a second end and being concentrically disposed about said rod, each end of said helical member being secured in a fixed position to said bracket for positioning of the pointing device in a selected user position relative to said housing.

8. Apparatus of claim 7 wherein said helical member provides a torque rating between 24 ounce inch to 64 ounce inch about said rod for positioning the pointing device.

9. Apparatus of claim 8 wherein said helical member provides a torque rating of approximately 32 ounce inches about said rod.

10. Apparatus of claim 7 wherein said attachment housing includes at least one friction pad for reducing movement of the apparatus when said apparatus is in a free-standing position.

11. Apparatus for positioning a pointing device relative to a computer, said apparatus comprising an attachment housing having a clamping side, said clamping side having a longitudinal axis, a passage having an axis and extending through said housing, said passage axis being substantially parallel to said clamping side longitudinal axis, clamp mounted with said housing, said clamp movable relative to said housing between a home position and an extended position for clamping said housing to the computer, a pair of buttons positioned in said passage and engaging said clamp, said buttons movable in said passage for moving the clamp from said home position to said extended position, and a hinge disposed between said housing and the pointing device for pivotal movement of the pointing device relative to said housing.

12. Apparatus of claim 11 further comprising urging means for urging said clamp from said extended position to said home position.

13. Apparatus of claim 11 wherein said clamp comprises a clamp jaw, a holding means, a ramp, and a plate to interconnect said clamp jaw, said ramp and said holding means.

14. Apparatus of claim 11 further comprising at least one spring disposed between said holding means and said clamping side of said attachment housing for urging said clamp jaw from said extended position to said home position.

15. Apparatus for positioning a pointing device relative to a computer, said apparatus comprising an attachment housing having a clamping side, said clamping side having a longitudinal axis, a passage having an axis and extending through said housing, said passage axis being substantially parallel to said clamping side longitudinal axis.

a clamp mounted with said housing, said clamp movable relative to said housing between a home position and an extended position for clamping said housing to the computer, a button positioned in said passage for moving the clamp from said home position to said extended position, and a hinge disposed between said housing and the pointing device for pivotal movement of the pointing device relative to said housing.

\* \* \* \* \*